Oct. 24, 1950     L. W. VON LOSBERG ET AL     2,527,471
APPARATUS FOR INSERTING STICKS IN STICKHOLDERS

Filed Nov. 5, 1946                                6 Sheets-Sheet 1

INVENTORS
Lester W. Von Losberg
Aaron Friedman
BY
Richard J. Cowling
ATTORNEY

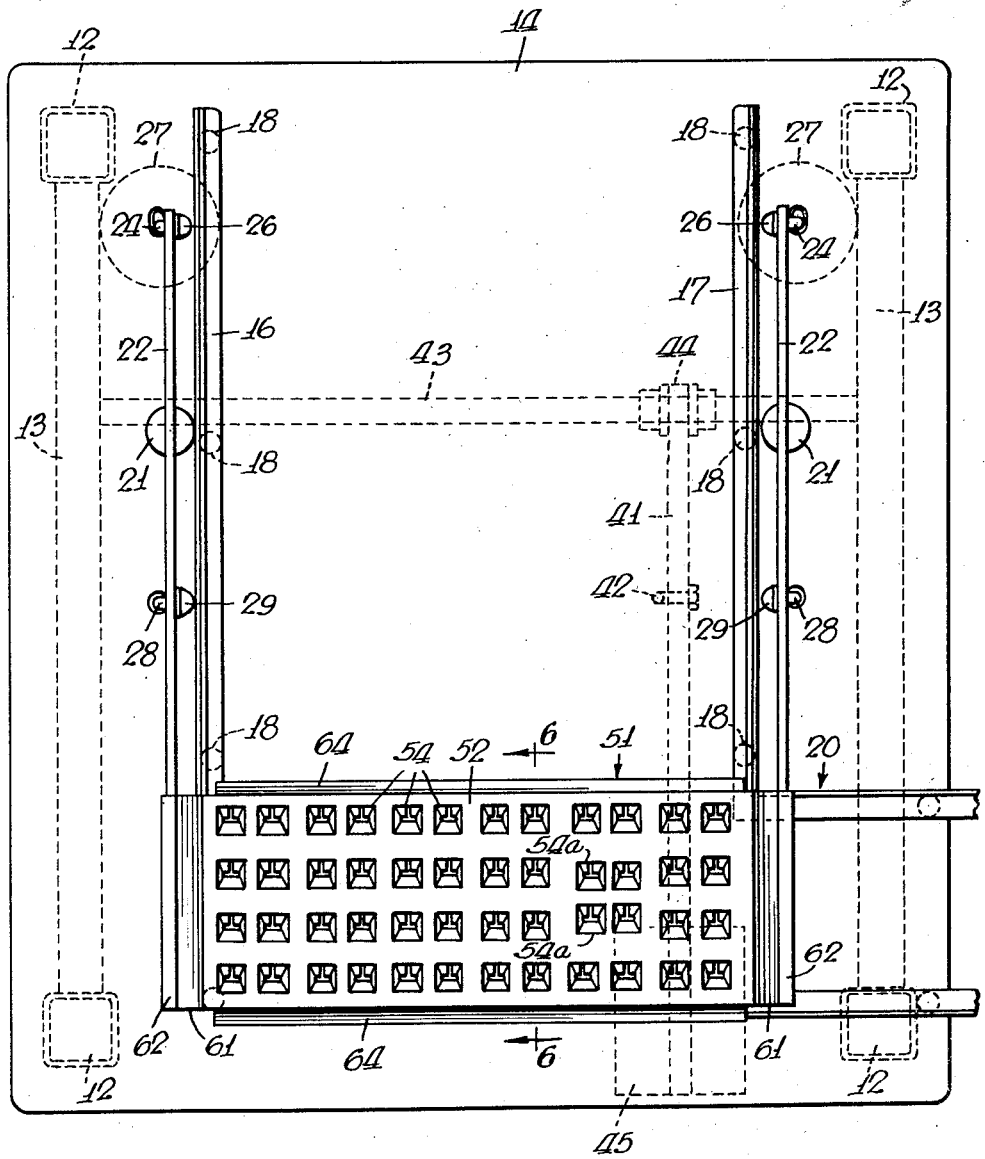

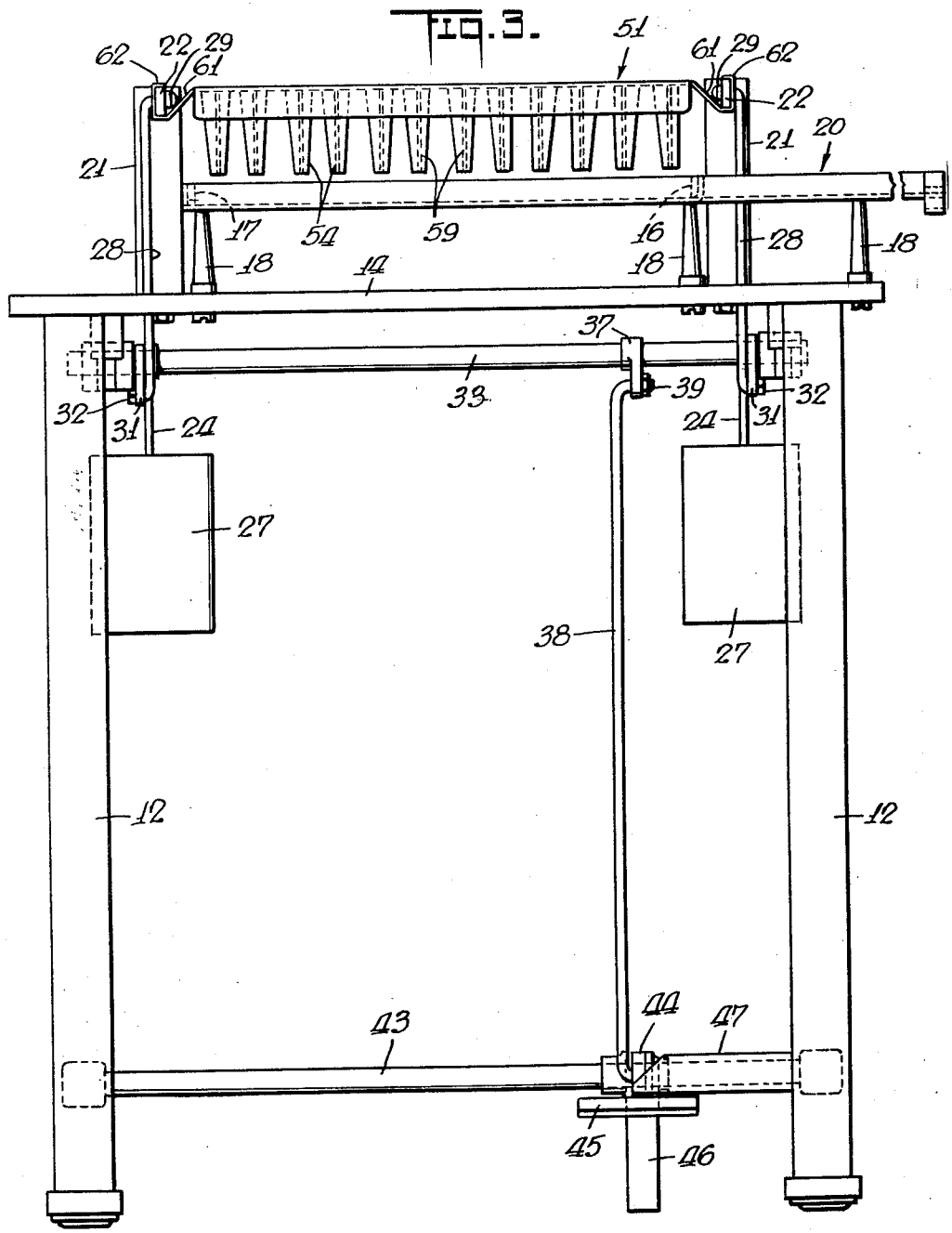

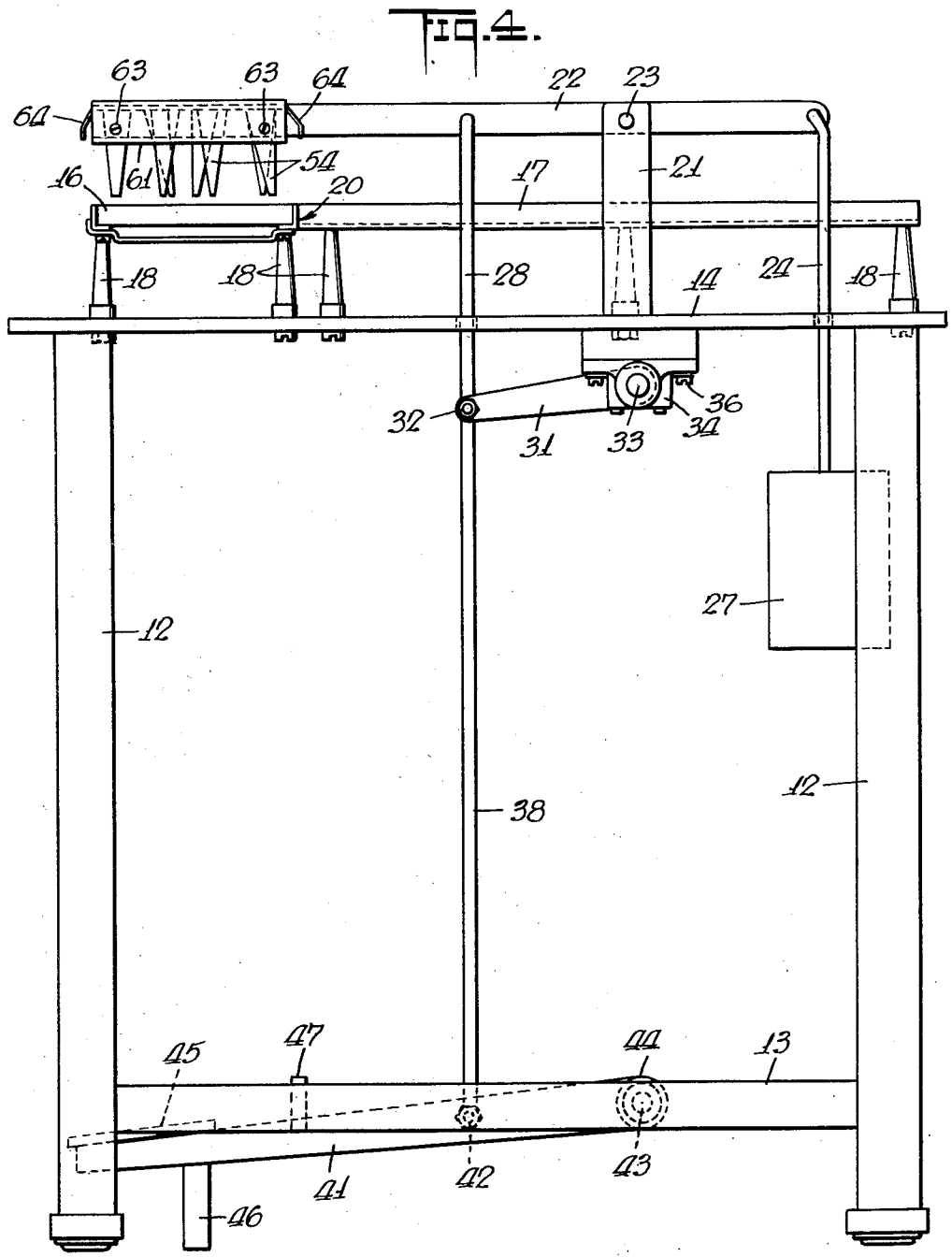

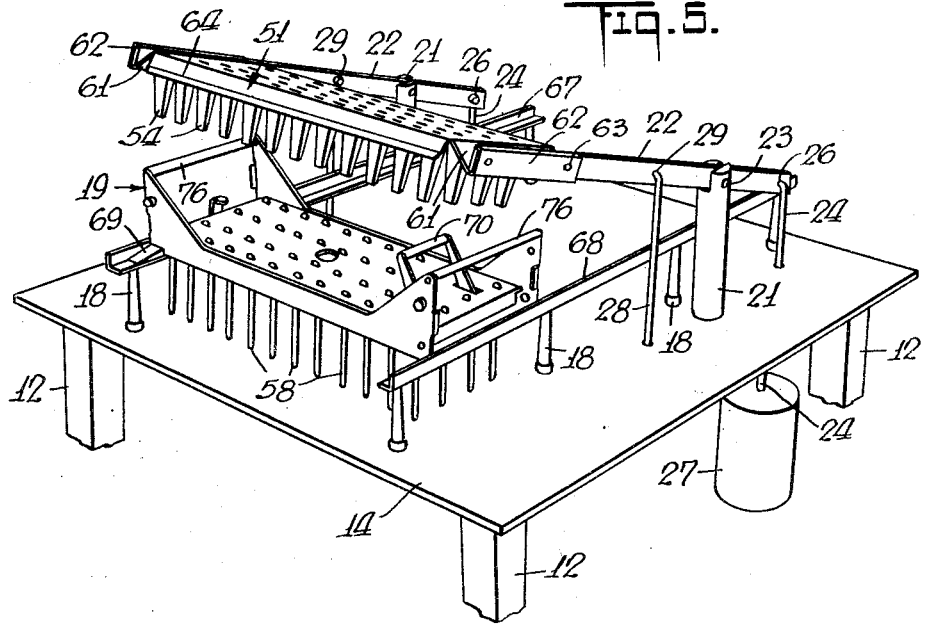
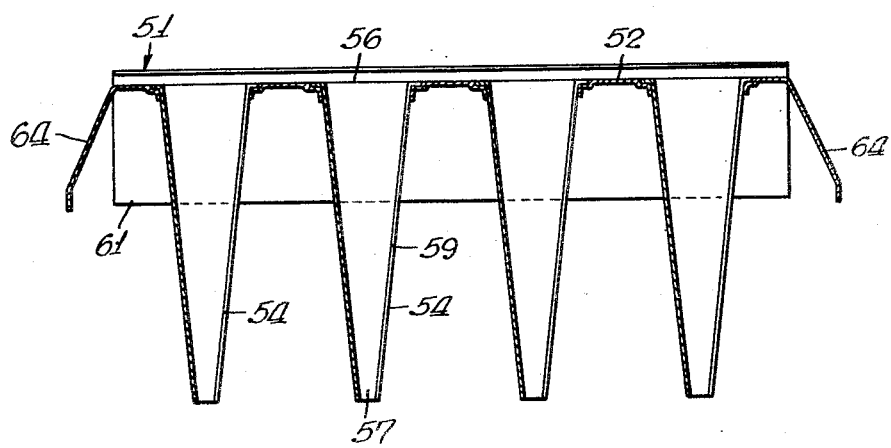

Oct. 24, 1950 L. W. VON LOSBERG ET AL 2,527,471
APPARATUS FOR INSERTING STICKS IN STICKHOLDERS
Filed Nov. 5, 1946 6 Sheets-Sheet 6
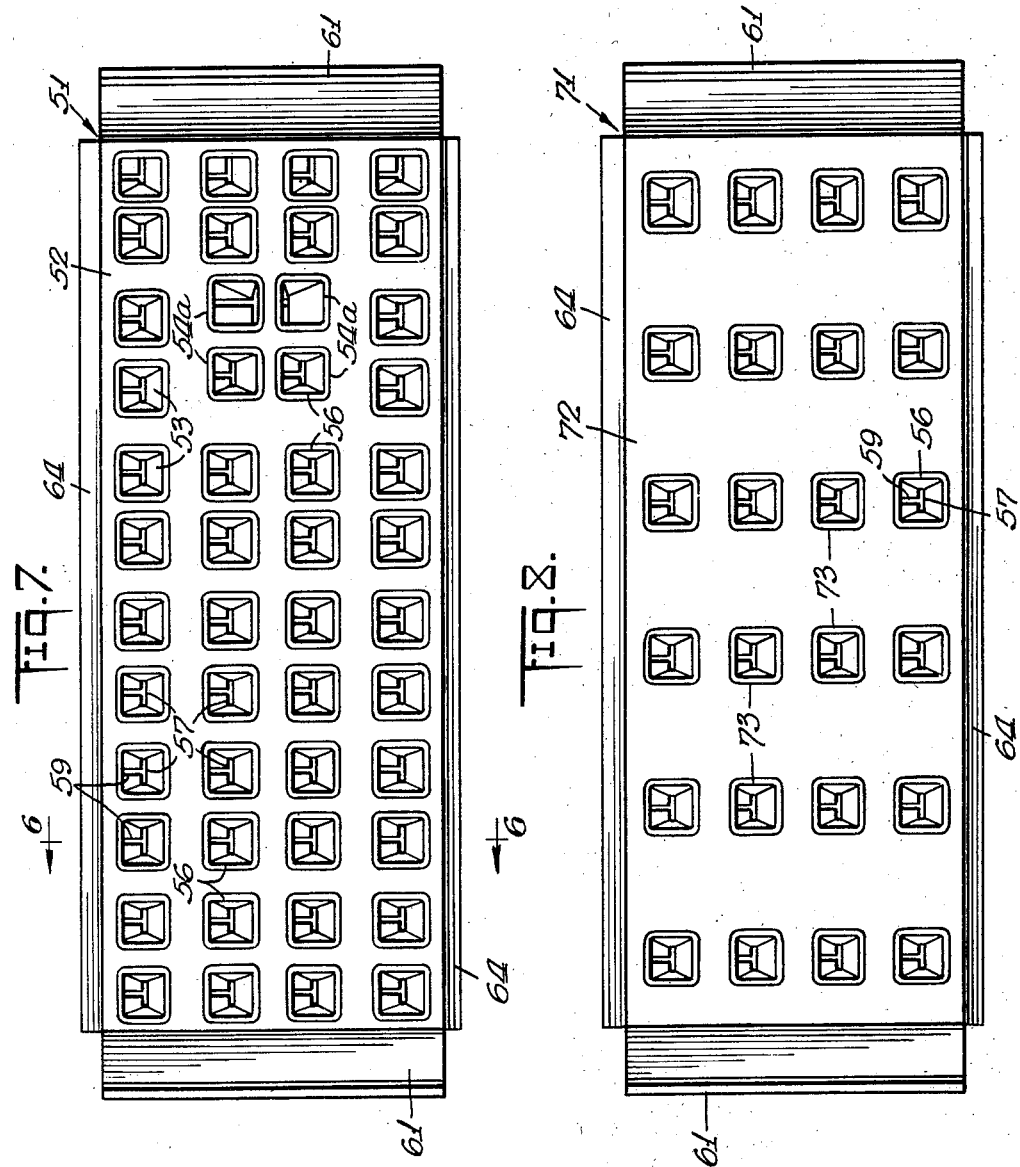
INVENTORS
Lester W. Von Losberg
Aaron Friedman
BY
Richard J. Newling
ATTORNEY Patented Oct. 24, 1950

2,527,471

UNITED STATES PATENT OFFICE 2,527,471

APPARATUS FOR INSERTING STICKS IN STICK HOLDERS

Lester W. Von Losberg and Aaron Friedman, New York, N. Y., assignors to Joe Lowe Corporation, New York, N. Y., a corporation of Delaware Application November 5, 1946, Serial No. 707,866

6 Claims. (Cl. 226—14)

The present invention relates generally to apparatus for handling confectionery handle sticks, and it has relation particularly to apparatus capable of facilitating the insertion of handle sticks in portable stickholders of the type used in the frozen confectionery industry.

In the frozen confectionery industry relatively thin, flat, elongated sticks are employed as handle members for the finished frozen confections, and a plurality of such handle sticks are locked releasably in a stickholder, which assures accurate centering of the handle sticks in the cavities of multiple cavity molds containing the liquid or syrupy admixture to be frozen. One type of stickholder used generally in the industry is shown in United States Letters Patent No. 2,024,116, issued December 10, 1935, which has built-in features to facilitate the insertion of the handle sticks therein.

With the development of the industry, sanitary requirements for apparatus used therein have become increasingly more exacting until today, in some sections of the country, it has become impossible to obtain permission of the health authorities to use any apparatus that is not capable of being dismantled completely for thorough cleaning. Under such exacting conditions, it became necessary to devise a stickholder free of pockets or guideways that are difficult to clean and which might harbor dirt or bacteria. Such a stickholder is shown in United States Letters Patent No. 2,321,632, issued June 15, 1943.

In the entire frozen confectionery industry, which in volume exceeds a billion handle stick confections annually, upwards of ninety per cent of the industry still inserts or loads manually the handle stick in the stickholders. No serious difficulty was encountered in the manual operation of inserting the handle sticks in the earlier type of stickholders, having a funnel or guideway for facilitating the insertion of handle sticks, but considerable difficulty has been encountered with the more sanitary type of stickholder having only aligned apertures therethrough. In such stickholders, it is difficult to insert the small, thin, flat and elongated sticks in the relatively small narrow openings through the locking plates, resulting in a great loss in production unless an increase was made in the number of employees used for the particular operation of loading such stickholders with handle sticks.

Many attempts have been made to insert such handle sticks in the stickholders by machine, but none of such devices has been received with great enthusiasm in the industry. One reason for the lack of success or enthusiasm of the automatic stick inserting machines is the fact that such machines require especially banded packages of handle sticks of more exacting dimensions as compared to the dimensions of the manually inserted handle sticks. Such banded handle sticks cost substantially twice that of the regular handle sticks capable of use in stickholders when inserted manually, and such cost is considered prohibitive in most plants because of their limited production.

With the present invention we have overcome the aforementioned disadvantages of manually loading the more modern stickholders, and we have devised an apparatus capable of facilitating the insertion of handle sticks in the latest types of sanitary stickholders manually with the same ease and efficiency of operation as was enjoyed in connection with the earlier types of stickholders.

An object of the present invention is to provide a simple, durable and inexpensive aparatus for association with conventional stickholders of all kinds and/or types for facilitating the loading thereof manually with a plurality of relatively thin, flat, elongated wooden handle sticks.

Another object of the invention is the provision of apparatus of the character described which is efficient and inexpensive to operate, having a minimum of moving parts, requiring very little manual exertion on the part of the operator to effect the delivery of the handle members to the stickholder regardless of the character of its construction.

Other and further objects and advantages of the invention reside in the detailed construction of the apparatus, which result in simplicity, economy and efficiency, and which will be apparent from the following description, wherein two forms of embodiment of the invention are shown, reference being had to the accompanying drawings, forming a part hereof, in which like numerals indicate like parts:

Figure 2 is a top plan view of the apparatus shown in Figure 1, on a slightly larger scale, without the stickholder and its depending handle sticks;

Figure 3 is a front elevational view of the apparatus shown in Figure 2;

Figure 4 is a side elevational view of the apparatus shown in Figure 2;

Figure 5 is a fragmentary perspective view of a modified form of apparatus, showing the same in its raised position for receiving or removing a conventional stickholder, and illustrating a modified form of trackway for receiving and supporting the stickholders;

Figure 6 is a fragmentary enlarged sectional view of the stick guiding member shown in Figure 7, the same having been taken substantially along the line 6—6 thereof, looking in the direction of the arrows;

Figure 1:
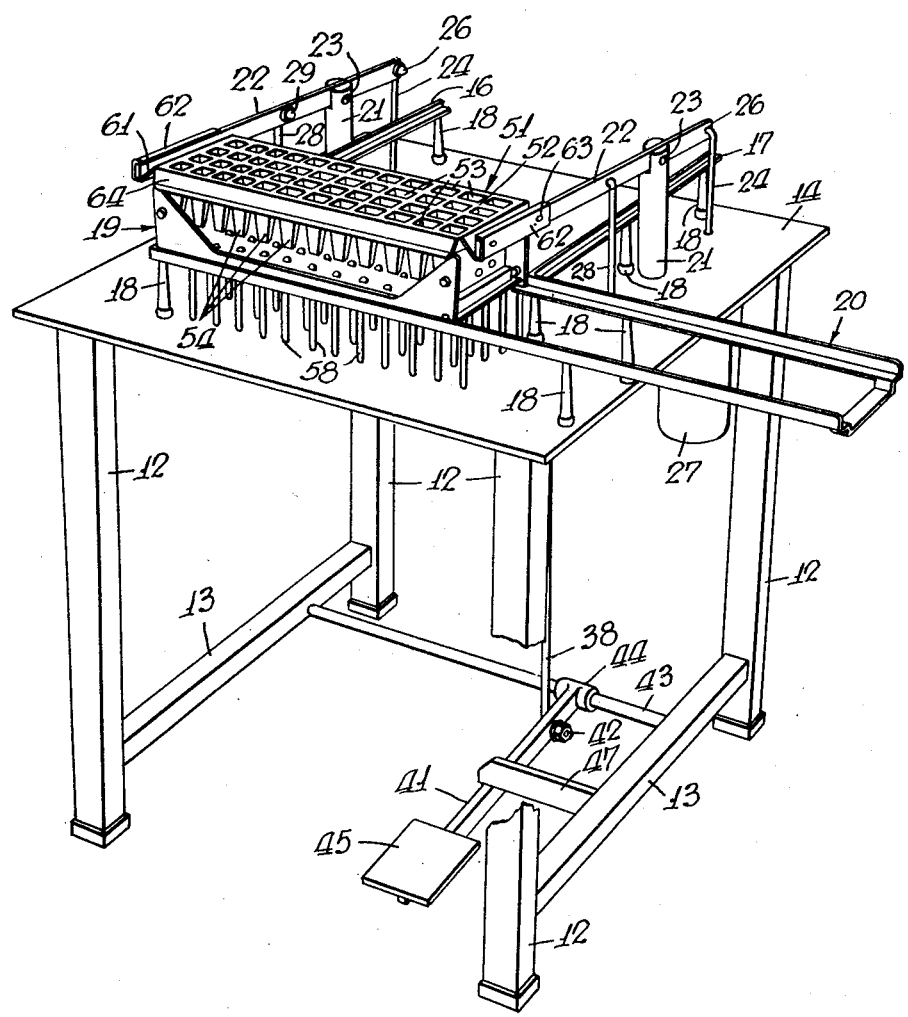
Figure 1 is a fragmentary perspective view of an apparatus constructed in accordance with the principles of the invention, the same showing the apparatus substantially in stick delivery position with a conventional "twin" or forty-eight apertured stickholder in normal stick receiving position, having a series of handle sticks loaded therein.

Figure 7 is an enlarged top plan view of the removable stick guiding member shown in Figures 1 to 4, which is designed for a stickholder capable of holding forty-eight handle sticks, such as are used in making conventional "twin" confectionery products; and Figure 8 is a top plan view of a modified form of a removable stick guiding member, which has been designed for use interchangeably with the stick guiding member shown in Figure 7, and is intended to be used in conjunction with a stickholder capable of holding twenty-four sticks for making conventional or single stick confectionery products.

Referring now to the drawings, and particularly to Figures 1 to 4 thereof, there is shown a supporting structure consisting of a plurality of uprights or legs 12 suitably braced horizontally intermediate their ends by cross-bars 13. A flat sheet of stainless steel 14 is mounted securely and in a horizontal plane on the tops of the uprights 12, providing a horizontal gauging table therefor. A pair of relatively widely spaced rails 16 and 17 are mounted by means of suitable uprights 18 on top of the gauging table 14, forming a longitudinal trackway adapted to receive and support a conventional stickholder 19 thereon in proper spaced relation above the top of said gauging table 14. In the illustration shown in Figures 1 to 4, the rail 17 is shorter than the rail 16, and connects with a transverse delivery trackway 20, which is part of a conveying system (not shown).

A pair of transversely spaced uprights 21, which are bifurcated at their upper ends, are mounted on the top of the gauging table 14 on the outer sides of the trackway rails 16 and 17 and intermediate their ends. The uprights 21 project a substantial distance above the rails 16 and 17. A pair of spaced levers 22 are mounted pivotally intermediate their ends on the uprights 21 between the bifurcations by means of pins 23. The back or rear end of each of the levers 22 has a rod 24 connected pivotally thereto, as indicated at 26. Each rod 24 extends downwardly a short distance through the gauging table 14, and has a counterweight 27 mounted on the lower end thereof. A second rod 28 is mounted pivotally intermediate the forward end of each of the levers 22, as indicated at 29, and extends downwardly through the gauging table 14.

Referring now to Figure 4, the lower end of each of the rods 28 is connected pivotally to the end of a crank arm 31, as indicated at 32, which, in turn, has its opposite end keyed to a shaft 33 journalled in suitable bearing blocks 34 secured to the underside of the gauging table 14 by means of bolts 36.

Referring now to Fig. 3, a crank arm 37 is keyed to the shaft 33 intermediate the crank arms 31, and has a depending connecting lever 38 secured pivotally thereto, as indicated at 39, which has its lower end likewise connected pivotally to a crank lever 41, as indicated at 42 (see Fig. 4). The lever 41 has its rear end rotatably mounted on a fixed transversely extending rod 43 secured between the horizontal cross-bars 13, as indicated at 44. A conventional foot treadle 45 is secured to the forward end of the lever 41. A fixed vertical stop 46 projects downwardly from the underside of the foot treadle 45 to limit its downward movement. A second fixed stop consisting of a short transversely extending bracket 47 is welded or otherwise secured to one of the cross-bars 13 to limit the upward movement of the lever 41 and its foot treadle 45.

A guide member 51 consisting of a pan 52 having a plurality of spaced apertures therein, as indicated at 53, has a series of depending funnel-shaped tubular guides 54 welded, soldered or otherwise secured therein. Each of the guides 54 is formed by bending a single flat strip of stainless sheet metal into a funnel-shaped tubular member, having a relatively large square open-top 56 and a relatively narrow slotted or rectangular open-bottom 57, which is slightly larger in shape and dimensions than the cross-sectional shape and dimensions of a confectionery handle stick 58. Each of the tubular guides 54 has a small longitudinal slot 59 extending along one side thereof, which serves no useful purpose but is formed in bending the stainless sheet metal strips into funnel-shaped guides, whose sides do not quite meet since it is not necessary to weld or join the side edges of the strips together to form a solid tubular guide.

It will be noted that the ends of the pan 52 have an integral flange 61 extending divergently downwardly and outwardly therefrom, and that the extreme outer end of each of said flanges 61 is bent upwardly and inwardly, as indicated at 62, to conform to the outer contour of the levers 22 over which they are intended to be mounted. The guide member 51 is mounted removably between the forward ends of the levers 22, and secured releasably in a fixed position thereon by means of suitable set screws 63. The pan 52 is also provided with integral flanges 64 extending divergently downwardly and outwardly from its front and back sides thereof, as best shown in Figure 4. The flange 61 and 64 serve to engage the stickholder 19, as best shown in Figure 1, and assure proper centering of the same under the guide member 51. When the stickholder 19 is centered under the guide member 51, the bottom slots 57 of the tubular guides 54 are in vertical alignment with the stick receiving apertures of the stickholder 19 since they are spaced correspondingly.

Referring now to Figure 5, there is shown a modified form of stick placing apparatus, which is identical in construction with the apparatus shown in Figures 1 to 4 except for the trackway for receiving and supporting the stickholders 19. In this modification, the trackway consists of two longitudinally extending and transversely spaced rails 67 and 68, open at either end. The stickholder 19 is positioned manually on the rails 67 and 68, and its forward or front side is drawn against a fixed centering stop or block 69 mounted thereon adjacent the front ends thereof.

There is shown in Figure 7 an enlarged view of the guide member 51, which is mounted on the apparatus shown in Figures 1 to 4. This guide member 51 has forty-eight spaced tubular guides 54 arranged in rows extending transversely and longitudinally thereof. It will be noted that several of the guides, which are indicated by the numeral 54a, are slightly out of alignment, and have bottom openings that are off-center to varying degrees. The reason for these irregularities is due to the fact that sufficient clearance must be provided for the locking handle 70 of the stickholder 19, which is an integral part of the construction thereof, and cannot be removed for loading purposes (see Fig. 5). The forty-eight guides 54 and 54a of the guide member 51 shown in Figure 7 are adaptable for making "twin" confections, i. e., a single confectionery body having two spaced handle sticks, which confectionery body is capable of being broken or pulled into halves, each having its own handle stick, making two separate confections.

The guide member 71 shown in Figure 8 has a guide pan 72 provided with but twenty-four spaced tubular guides 73, arranged in rows extending transversely and longitudinally thereof. This guide member 71 is constructed identically with the guide member 51 except for guide pan 72 and the number of guides 73. It is adapted to be substituted for the guide member 51 in the apparatus shown in Figures 1 to 5 when "regular" confectionery products are being produced, i. e., confectionery products having but one handle stick. Since the dimensions of the guide pan 72 having the twenty-four guides 73 are the same as the dimensions of the guide pan 52 having forty-eight guides 54, and since there is a much larger space between each of the guides in the former, it is not necessary to off-set any of them to allow for clearance of the handle 70 of the stickholder 19, as previously described.

In the operation of the apparatus shown in Figures 1 to 4, the counterweights 27 are sufficiently heavy to keep the guide member 51 elevated normally in a position where a conventional stickholder 19 can be moved thereunder along either of the trackways. The stickholder 19 is moved into loading position, which, in the first instance, is determined by the junction corner of the trackways of the apparatus shown in Figures 1 to 4, and the stops 69 of the apparatus shown in Figure 5. The operator now presses downwardly with his foot on the foot treadle 45. The lever 41 supporting the foot treadle 45 is also moved downwardly, drawing its connecting lever 38 downwardly. The upper end of the connecting lever 38, which is secured to the crank 37 keyed to the shaft 33 (see Fig. 3), causes the same to rotate as it is pulled downwardly. Rotation of the shaft 33 causes the crank arms 31 to rotate with it, drawing down on their connecting levers 28, which in turn causes the levers 22 to pivot about their fulcruming posts 21. The forward ends of the levers 22 having the guide member 51 mounted therebetween are pulled downwardly, whereupon the flanges 61 and 64 engage the upwardly projecting parts of the stickholder 19, such as the handles 76. The flanges 61 and 64, being on all sides of the guide member 51, engage the stickholder 19 from all directions and cause very accurate centering of the same thereover, which centering brings the bottom of each tubular guide 54 contiguous to and in alignment with a stick receiving opening in the stickholder 19. When the forward ends of the levers 22 are pulled downwardly, it is obvious that their opposite or rear ends, which are on the other side of the fulcruming posts 21, will be moved upwardly against the gravity action of the counterweights 27, which are secured to the lower ends of the rods 24. In this position, and while the operator keeps his foot on the foot treadle 45, the handle sticks 58 are dropped manually one each into the guides 54, whereupon they will gravitate therethrough and partially through the aligned stick receiving openings in the stickholder 19 until their lower ends rest on the top surface of the gauging table 14. In this manner the distance to which each of the handle sticks 58 depends from the stickholder 19 is controlled so that when the stickholders are positioned over their freezing molds (not shown) the handle sticks 58 will be centered and also submerged in the liquid to be frozen to the desired depth. After the handle sticks 58 have been deposited in each of the tubular guides 54, the operator merely removes his foot from the foot treadle 45, and the counterweights 27 urge the guide member 51 upwardly and away from the stickholder 19, whereupon the operator may lock the handle sticks 58 in the stickholder by moving the locking handle 70 to the right and adjacent one of the manipulating handles 76. The loaded stickholder 19 may now be pushed along the trackway to the next operation, and another empty stickholder slid into loading position.

Although we have described in detail only two modifications which our invention may assume, it will be apparent to those skilled in the art that the invention is not so limited, but that various modifications may be made therein without departing from the spirit thereof or from the scope of the appended claims.

What we claim is:

1. In a machine of the character described, and in combination with a portable stickholder having a plurality of spaced stick receiving openings therethrough, a supporting structure, a gauging table mounted on said supporting structure, trackway for supporting a stickholder in spaced relation above said gauging table, a pivotal guide member mounted above said supporting means having a plurality of tubular guides spaced to correspond with the spacing of said stick receiving openings in said stickholder, and means for actuating said guide member to bring its guides in alignment with the openings of said stickholder.

2. In a machine of the character described, and in combination with a portable stickholder having a plurality of spaced stick receiving openings, a supporting structure, a gauging table mounted on said supporting structure, trackway for supporting a stickholder above said gauging table, a removable guide member pivotally mounted above said supporting means having a plurality of tubular guides spaced according to the spacing of the openings in said stickholder, and means for actuating said guide member to bring each of its guides into alignment with one of the openings in said stickholder.

3. In a machine of the character described, and in combination with a portable stickholder having a plurality of spaced stick receiving openings, a supporting structure, a gauging table mounted on said supporting structure, a trackway for supporting a stickholder above said gauging table, a removable guide member pivotally mounted above said supporting means having a plurality of funnel-shaped guides depending therefrom and spaced according to the openings in said stickholder, and means for actuating said guide member to bring each of its guides in juxtaposition with one of the openings in said stickholder.

4. In a machine of the character described, and in combination with a portable stickholder having a plurality of spaced stick receiving openings, a supporting structure, a gauging table mounted on said supporting structure, a trackway for supporting a stickholder above said gauging table, a removable guide member mounted above said supporting means having a plurality of funnel-shaped guides depending therefrom and spaced according to the openings in said stickholder, means for normally holding said guide member away from said trackway, and means for actuating said guide member towards said trackway in order to bring each of its depending guides into alignment with one of the openings in said stickholder.

5. In a machine of the character described, and in combination with a portable stickholder having a plurality of spaced stick receiving openings, a supporting structure, a gauging table mounted on said supporting structure, a trackway for supporting a stickholder above said gauging table, a removing guide member pivotally mounted above said supporting means having a plurality of funnel-shaped guides depending therefrom and spaced according to the openings in said stickholder, means including counterweights for normally holding said guide member away from said trackway, and means including a foot treadle for actuating said guide member towards said trackway in order to bring each of its depending guides into alignment with one of the openings in said stickholder.

6. In a machine of the character described, and in combination with a portable stickholder having a plurality of spaced stick receiving openings, a supporting structure, a gauging table mounted on said supporting structure, a trackway for supporting a stickholder above said gauging table, a removable guide member pivotally mounted above said supporting means having a plurality of funnel-shaped guides depending therefrom and spaced according to the openings in said stickholder, means for actuating said guide member to bring it into juxtaposition with said stickholder, and means carried by said guide member for engaging said stickholder to center the same accurately thereover whereby each of the lower ends of said funnel-shaped guides is aligned with an opening in said stickholder.

LESTER W. VON LOSBERG.
AARON FRIEDMAN.

REFERENCES CITED

The following references are of record in the file of this patent:

UNITED STATES PATENTS

| Number | Name | Date |
| --- | --- | --- |
| 1,258,012 | Jedel | Mar. 5, 1918 |
| 1,325,752 | Pope | Dec. 23, 1919 |
| 1,953,507 | Schnaier | Apr. 3, 1934 |
| 1,966,048 | Schnaier | July 10, 1934 |